(12) United States Patent
Kim et al.

(10) Patent No.: US 9,210,121 B2
(45) Date of Patent: Dec. 8, 2015

(54) DOMAIN NAME SYSTEM ADDRESS CONFIGURATION METHOD AND APPARATUS

(75) Inventors: Jin Yup Kim, Yongin-si (KR); Kyoung Youp Park, Suwon-si (KR); Jun Hwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/464,049

(22) Filed: May 4, 2012

(65) Prior Publication Data

US 2013/0159482 A1 Jun. 20, 2013

(30) Foreign Application Priority Data

Dec. 14, 2011 (KR) .................... 10-2011-0134686

(51) Int. Cl.
  *G06F 15/177* (2006.01)
  *H04L 29/12* (2006.01)
  *G06F 15/16* (2006.01)

(52) U.S. Cl.
  CPC ......... *H04L 61/1511* (2013.01); *H04L 61/2015* (2013.01)

(58) Field of Classification Search
  CPC .................. H04L 61/1511; H04L 61/2015
  USPC ................................. 709/222, 220
  See application file for complete search history.

(56) References Cited

U.S. PATENT DOCUMENTS

| | | | |
|---|---|---|---|
| 8,305,933 B2 * | 11/2012 | Aboughanaima et al. | 370/254 |
| 2006/0039352 A1 * | 2/2006 | Karstens | 370/352 |
| 2008/0201477 A1 | 8/2008 | Gray et al. | |
| 2009/0039352 A1 * | 2/2009 | Kobayashi et al. | 257/59 |
| 2011/0106919 A1 | 5/2011 | Mazur et al. | |

FOREIGN PATENT DOCUMENTS

WO 2009/005433 A1 1/2009

OTHER PUBLICATIONS

Raam Dev: "Configuring Static DNS with DHCP on Debian/Ubuntu", Feb. 23 2009, pp. 1-5, http://raamdev.com/2009/configuring-static-dns-with-dhcp-on-debianubuntu/.*
Linux: "dhclient.conf", About.com Linux, Nov. 30, 2010, pp. 1-6, http://web.archive.org/web/20101130104901/http://linux.die.net/man/5/dhclient.conf.*
Raam Dev: "Configuring Static DNS with DHCP on Debian/Ubuntu", Feb. 23, 2009, pp. 1-5, http://raamdev.com/2009/configuring-static-dns-with-dhcp-on-debianubuntu/.*

(Continued)

*Primary Examiner* — Hee Soo Kim
(74) *Attorney, Agent, or Firm* — Jefferson IP Law, LLP

(57) ABSTRACT

A method and an apparatus for configuring Domain Name System (DNS) address of a terminal are provided. The DNS address configuration method of a terminal according to an exemplary embodiment of the present invention includes establishing a connection with a network, requesting the network for the DNS address, determining whether the DNS address is successfully received from the network, and configuring, if the DNS address is not successfully received, the DNS address of the terminal with an auxiliary DNS address stored in the terminal. The DNS address configuration method and apparatus according to an exemplary embodiment of the present invention is advantageous to configure the DNS address of a terminal even if the terminal fails to receive the DNS address from the network or if the received DNS address is erroneous.

15 Claims, 5 Drawing Sheets

(56) References Cited

OTHER PUBLICATIONS

"dhclient.conf(5) Linux Man Page", Wayback Machine Jul. 14, 2007, https://web.archive.org/web/20070714154546/http://linux.die.net/man/5/dhclient.conf.*

Raam Dev, Configuring Static DNS with DHCP on Debian/Ubuntu, XP055058749, Feb. 23, 2009.

Linux, dhclient. conf, About.com Linux, XP055058753, Nov. 17, 2011.

* cited by examiner

DOMAIN NAME SYSTEM ADDRESS CONFIGURATION METHOD AND APPARATUS

PRIORITY

This application claims the benefit under 35 U.S.C. §119 (a) of a Korean patent application filed on Dec. 14, 2011 in the Korean Intellectual Property Office and assigned Serial No. 10-2011-0134686, the entire disclosure of which is hereby incorporated by reference.

BACKGROUND OF THE INVENTION

1. Field of the Invention

The present invention relates to a method and apparatus for configuring a Domain Name System (DNS) address of a terminal.

2. Description of the Related Art

The Internet is a global system of interconnected computer networks. A computer connected to one of the computer networks is identified by a unique address. The address (i.e. an Internet Protocol (IP) address), comprises numbers which make the address of a specific computer difficult to remember. Domain Name is a representation for an IP address to help a user to remember an address for a specific computer.

A Domain Name System (DNS) server sends a DNS query response in response to a DNS query request. The DNS query request is the request for an IP address matching a domain name (e.g., the domain) included in the request message. The DNS server searches for an IP address matching the domain and sends the found IP address as a reply to the DNS query request.

FIG. 1 is a signaling diagram illustrating a method corresponding to a DNS query procedure according to the related art.

Referring to FIG. 1, a communication system 100 includes a terminal 110 and a network 120 to which the terminal 110 is connected. The network 120 can be one of an Access Point of Wireless Local Area Network (WLAN), an Evolved Node B (eNB) of a Packet Data Network (PDN), or the like.

The terminal 110 establishes a connection with the network 120 at step 130. Once the connection has been established, the terminal 110 requests the network 120 for an IP address and a DNS address at step 140. For example, the terminal 110 may transmit a request for an IP address to a DNS server connected to the network 120. Afterward, the terminal 110 may receive the IP address but fail to receive the DNS address as shown at step 150. As a consequence, the terminal fails to configure the DNS address at step 160. In order to access a certain domain name entity, the terminal 110 generally must send a DNS query request to the DNS server. In the above situation, however, because the configuration of the DNS address failed, the terminal 110 fails to send a DNS query request at step 170. Consequently, the terminal 110 cannot establish a connection for communication with an entity on the Internet.

If the terminal 110 is connected to a PDN, the terminal 110 may acquire an IP address without the DNS address or with an invalid DNS address due to the PDN provider or a connection attempt time. If the terminal 110 is connected to a WLAN, then the terminal 110 may fail to receive a DNS address due to a problem caused by an operator's mistake or due to a malfunction of the DNS server. Such situations cause end user problems such as Internet access failure.

Therefore, a need exists for configuring a valid DNS address when the DNS address acquired from the network is invalid due to a certain reason.

Therefore, a need exists for a system and method for performing a self diagnosis of a device without the inconvenience caused when manually selecting a self diagnosis item from a computer or a user interface.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for configuring a DNS address, particularly when a terminal has failed to receive the DNS address from the network or received an erroneous DNS address.

In accordance with an aspect of the present invention, a method for configuring a Domain Name System (DNS) address of a terminal is provided. The method includes establishing a connection with a network, requesting the network for the DNS address, determining whether the DNS address is successfully received from the network, and configuring, when the DNS address is not successfully received, the DNS address of the terminal with an auxiliary DNS address stored in the terminal.

In accordance with another aspect of the present invention, a terminal configured with a Domain Name System (DNS) address is provided. The terminal includes a communication unit which establishes a connection with a network, a DNS address acquisition unit which requests the network for the DNS address, a storage unit which stores at least one auxiliary DNS address, and a DNS address configuration unit which configures, if the DNS address is not received, the DNS address of the terminal with at least one auxiliary DNS address stored in the storage unit.

In accordance with another aspect of the present invention, a non-transitory computer readable storage medium of a terminal is provided. The non-transitory computer readable storage medium stores a program to configure a Domain Name System (DNS) address. The program includes instructions to cause a computer to transmit to a network a DNS address request for the DNS address, determine whether the DNS address is successfully received from the network, and configure, if the DNS address is not successfully receive, the DNS address to be one of at least one auxiliary DNS address stored in the terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
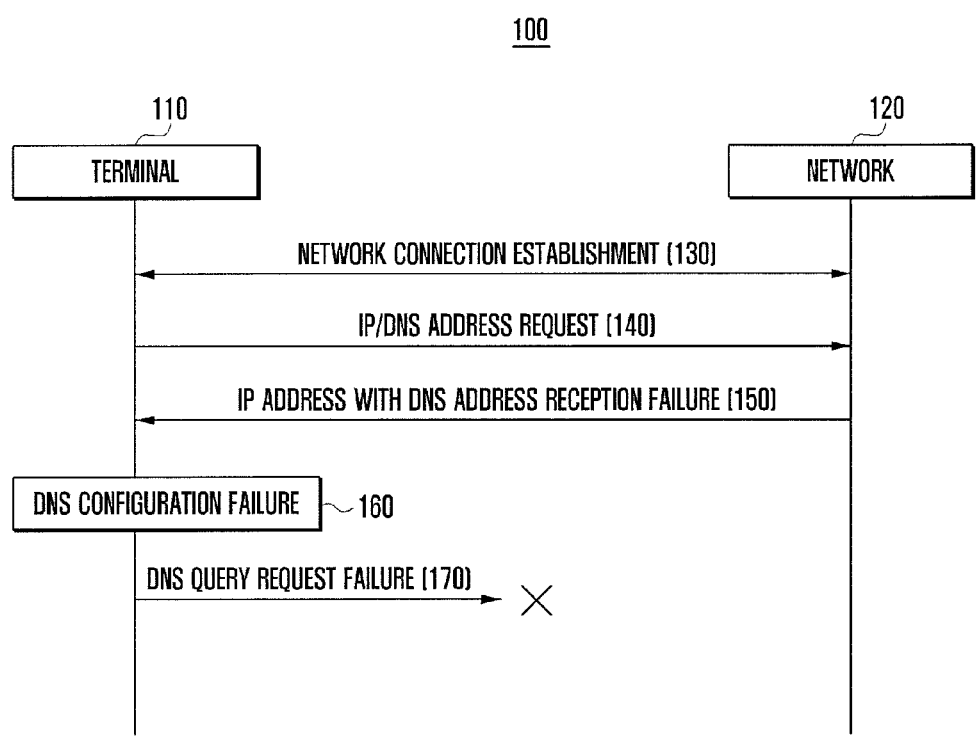
FIG. 1 is a signaling diagram illustrating a method corresponding to a DNS query procedure according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, description of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the drawings, certain elements may be exaggerated or omitted or schematically depicted for clarity of the invention, and the actual sizes of the elements are not reflected. The same reference numbers are used throughout the drawings to refer to the same or like parts.

A Domain Name System (DNS) address configuration method and apparatus according to an exemplary embodiment of the present invention is described hereinafter with reference to accompanying drawing.

Figure 2:
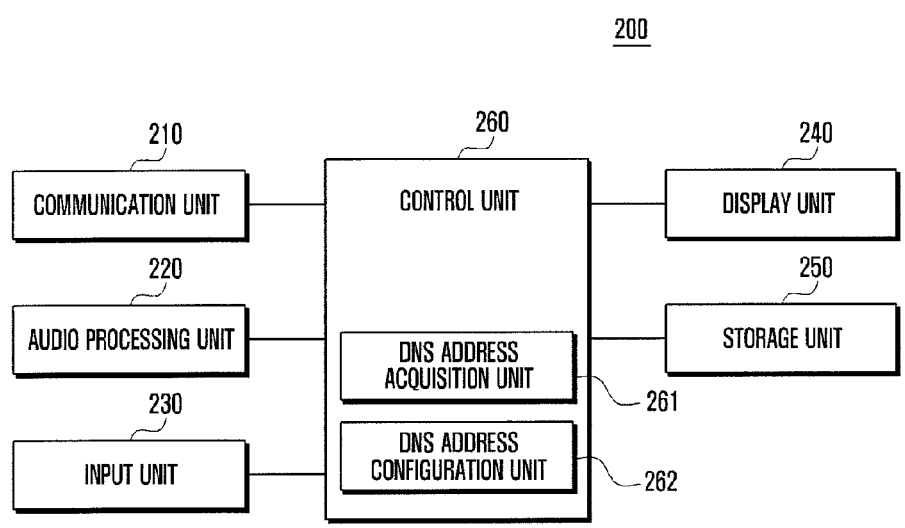
FIG. 2 is a block diagram illustrating a configuration of a terminal according to an exemplary embodiment of the present invention.

FIG. 2 is a block diagram illustrating a configuration of a terminal according to an exemplary embodiment of the present invention.

As shown in FIG. 2, the terminal 200 includes a communication unit 210, an audio processing unit 220, an input unit 230, a display unit 240, a storage unit 250, and a control unit 260.

The communication unit 210 is configured for transmitting/receiving radio signals carrying data over a wired and/or wireless channel. As an example, with regard to a configuration of the communication unit for performing radio communication, the communication unit 210 includes an RF transmitter for up-converting and amplifying a signal to be transmitted and an RF receiver for low noise amplifying and down-converting a received signal. The communication unit 210 also outputs the data received over the radio channel to the control unit 260 and transmits the data from the control unit 260 through the radio channel. The communication unit 210 can be an Access Point (AP) of a Wireless Local Area Network (WLAN), an Evolved Node B (eNB) of a Packet Data Network (PDN), or the like. The communication unit 210 establishes a connection with the network 120, sends a DNS query request to the network 120, and receives a DNS query response in response to the DNS query request.

The audio processing unit 220 includes at least one codec which includes a data codec for processing packet data and an audio codec for processing audio signal including voice. The audio processing unit 220 converts a digital audio signal to an analog audio signal by means of the audio codec so as to output the audio signal through a speaker (SPK) in the form of an audible sound wave, and converts the analog audio signal input through a microphone (MIC) to a digital audio signal.

The input unit 230 processes the input made by the user. Particularly in an exemplary embodiment of the present invention, the input unit 230 may receive an input made by the user for configuring an auxiliary DNS address. The input unit 230 can be implemented with a touchscreen, a keypad, or the like.

As an example, a keypad generates an input signal matching the key manipulation made by the user, and transmits the input signal to the control unit 260. The keypad may include numeric keys and navigation keys. The keypad may be provided with function keys at a side of the terminal 200. According to an exemplary embodiment of the present invention, the keypad can be substituted by or supplemented with a touch sensor or other input means that supports input manipulations substantially similar to those available with the keypad.

For example, a touch sensor can detect a touch input made by the user. The touch sensor may be implemented with a capacitive overlay technology, a resistive overlay technology, an infrared beam technology, a pressure sensing technology, and/or the like. Of course, other touch sensing technologies capable of sensing contact or pressure of an object may be used for the touch sensor. The touch sensor detects a touch input made by the user and transfers the input signal to the control unit 260. The input signal includes the coordinates at the position where the touch input is made. If the touch position moves, the input signal can include coordinates at the positions on the movement path. The touch sensor may be provided with a touchscreen formed over the display unit 240.

The displaying unit 240 can be configured with, for example, one of a Liquid Crystal Display (LCD), Organic Light Emitting Diodes (OLED), and Active Matrix OLED (AMOLED), or the like to display menus, input data, and function configuration and indication information of the terminal 200. The display unit 240 is provided for displaying a screen, an idle mode screen, a menu screen, a call progressing screen, and an execution screens of various applications. In particular, according to an exemplary embodiment of the present invention, the display unit 240 provides an interface for configuring an auxiliary DNS address of the terminal 200.

Although the description is directed to a terminal 200 that is equipped with a touch sensor, exemplary embodiments of the present invention are not limited thereto.

The storage unit 250 stores programs and data associated with the operations of the terminal 200. The storage unit 250 may be divided into a program region and a data region. For example, the program region stores programs for controlling general operations of the terminal 200, an Operating System (OS) for booting the terminal 200, and application programs for playing multimedia contents, executing supplementary functions of the terminal 200 such as a camera function, an audio playback function, and a still and motion picture playback function, or the like. As an example, the data region stores application data such as still and motion pictures, a phonebook, audio data, and/or the like. For example, according to an exemplary embodiment of the present invention, the storage unit 250 stores the auxiliary DNS address of the terminal 200.

The control unit 260 controls overall operations of the function blocks of the terminal 200. The control unit 260 may include a DNS address acquisition unit 261 and a DNS address configuration unit 262.

The DNS address acquisition unit 261 attempts to acquire a DNS address after the communication unit 210 has established a connection with the network 120.

If the DNS address acquisition unit 261 has acquired the DNS address, the DNS address configuration unit 262 configures terminal 200 with the acquired DNS address. If the DNS address acquisition unit 261 failed to acquire the DNS address, the DNS address configuration unit 262 configures the terminal 200 with the auxiliary DNS address.

The operations of the function blocks of the terminal 200 are described in more detail with reference to FIGS. 3 to 5.

Figure 3:
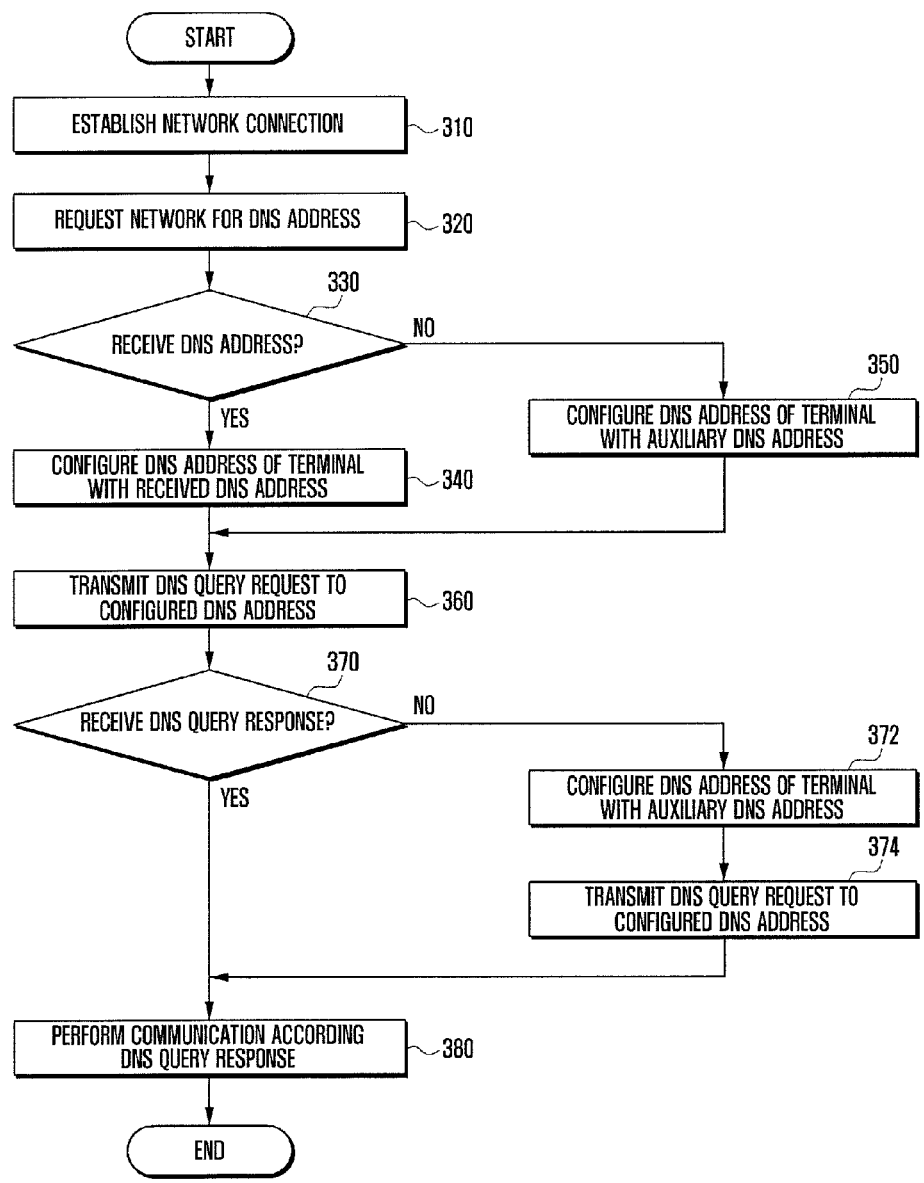
FIG. 3 is a flowchart illustrating a DNS address configuration method of a terminal according to an exemplary embodiment of the present invention.

FIG. 3 is a flowchart illustrating a DNS address configuration method of a terminal according to an exemplary embodiment of the present invention.

The communication unit 210 of the terminal 200 establishes a connection with the network 120 at step 310.

The network 120 can be represented by an AP of a WLAN, an eNB of a PDN, or the like. Once the communication unit 210 has established a connection with the network 120, the DNS address acquisition unit 261 attempts to acquire the DNS address at step 320. For example, the DNS address acquisition unit 261 transmits a DNS address request to the network 120. Next, the DNS address acquisition unit 261 determines whether the DNS address is acquired successfully at step 330.

Table 1 shows an example of a DNS address request message format following the 3GPP standard.

TABLE 1

SM_ACTIVATE_PDP_CONTEXT_REQUEST
    rfc1332_conf_req
        num_options = 2 (0x2)
        conf_options[0]
            type = 129 (0x81)
            rfc1877_primary_dns_server_add
                length = 6 (0x6)
                ip_addr = 0 (0x0) // (0.0.0.0)
        conf_options[1]
            type = 131 (0x83)
            rfc1877_sec_dns_server_add
                length = 6 (0x6)
                ip_addr = 0 (0x0) // (0.0.0.0)

Table 2 shows an example of a DNS address response message format following the 3GPP standard.

TABLE 2

SM_ACTIVATE_PDP_CONTEXT_ACCEPT
    rfc1332_conf_nak
        num_options = 2 (0x2)
        conf_options[0]
            type = 129 (0x81)
            rfc1877_primary_dns_server_add
                length = 6 (0x6)
                ip_addr = 2332499581 (0x9b071e7d) // (190.7.30.125)

TABLE 2-continued conf_options[1]
            type = 131 (0x83)
            rfc1877_sec_dns_server_add
                length = 6 (0x6)
                ip_addr = 2332499582 (0x8b071e7e) // (190.7.30.126)

Table 3 shows an example of a Dynamic Host Configuration Protocol (DHCP) DNS address response message format following the 3GPP standard.

TABLE 3

Option: (t=6, l=8) Domain Name Server
Option: (6) Domain Name Server
Length: 8
value: 0a29833ca5d5f6a1
IP Address: 10.41.131.60
IP Address: 165.213.246.161

The DNS address request and DNS address response may be configured in other formats different from the exemplary examples provided in Tables 1-3.

Returning to FIG. 3, the DNS address acquisition unit 261 determines whether the DNS address is received successfully in a predetermined time in response to the DNS address request at step 330. If the received DNS address is erroneous, (e.g. if an invalid DNS address (0.0.0.0) is received), then the DNS address acquisition unit 261 determines that the address acquisition has failed.

If it is determined that the DNS address has been acquired successfully at step 330, then the procedure goes to step 340. At step 340, the DNS address configuration unit 262 configures the terminal 200 with the DNS address received by the DNS address acquisition unit 261, (i.e. the DNS address acquired from the network 120).

If it is determined that the DNS address acquisition has failed at step 330, then the procedure goes to step 350. If the DNS address acquisition has failed, then the DNS address configuration unit 262 configures the terminal 200 with the auxiliary DNS address stored in the storage unit 250. As an example, the storage unit 250 can store one or more auxiliary DNS addresses. If multiple auxiliary DNS addresses are stored in the storage unit 250, then the auxiliary DNS addresses can be saved with different priorities. For example, when there are two or more auxiliary DNS addresses stored in the storage unit 250, the auxiliary DNS address assigned the highest priority is provided first for DNS address configuration.

Table 4 shows an exemplary example of an auxiliary DNS address management table.

TABLE 4

| Priority | Auxiliary DNS address |
|---|---|
| 1 | 208.67.222.222 |
| 2 | 8.8.4.4 |

For example, referring to the DNS address table provided in Table 4, the DNS address configuration unit 262 uses 208.67.222.222 first as the DNS address.

The display unit 240 can provide an interface allowing the user to configure the auxiliary DNS address by means of the input unit 230. For example, the user can input an auxiliary DNS address by means of the input unit 230. Alternatively, a default auxiliary DNS address may be configured by a software provider or a terminal manufacturer.

At step 360, the communication unit 210 transmits the DNS query request to the DNS address which was configured at step 340 or 350. For example, if the user attempts to access a website represented by the domain name of www.kipo.go.kr, the terminal 200 transmits a DNS query request message including the domain name of www.kipo.go.kr.

Afterward, the DNS address configuration unit 262 monitors to determine whether a DNS query response message is received successfully by the communication unit 210 at step 370. If an IP address of 152.99.202.101 corresponding to, for example, www.kipo.go.kr has been received in a predetermined time, then the DNS address configuration unit 262 determines that the DNS query response has been received successfully by the communication unit 210. Even if a message notifying of discovery failure of an IP address corresponding to www.kipo.go.kr in a predetermined time has been received, the DNS address configuration unit 262 may also determine that the DNS query response has been received successfully by the communication unit 210. The DNS address configuration unit 262 may determine that no DNS query response has been received by the communication unit 210 only if no response is received by the communication unit 210 in the predetermined time, or if the received response does not abide by the protocol. If the DNS query response has been received successfully by the communication unit 210 in response to the DNS query request, then the terminal performs communication using the DNS address carried in the DNS query response at step 380. If a message notifying of discovery failure of the IP address corresponding to www.kipo.go.kr has been received, then the display unit 240 may display an error message to the user.

If no DNS query response has been received in response to the DNS query request, then the procedure goes to step 372. At step 372, the DNS address configuration unit 262 configures the terminal 200 with an auxiliary DNS address stored in the storage unit 250. At this time, if the terminal 200 has already been configured with an auxiliary DNS address at step 350, then the DNS address configuration unit 262 configures with terminal 200 with another auxiliary DNS address having the next highest priority. For example, if the DNS query request has been transmitted with the auxiliary DNS address having the priority of 1 in Table 4 and if no DNS query response has been received, then the DNS address configuration unit 262 can configure the terminal 200 with the auxiliary DNS address of 8.8.4.4 having a priority of 2 in Table 4. Alternatively, the DNS address configuration unit 262 can repeat configuration of the DNS address with the auxiliary DNS addresses one by one until a valid DNS address is configured. Next, the communication unit 262 transmits a DNS query request including the configured DNS address at step 374.

Finally, the communication unit 210 receives the DNS query response including the IP address corresponding to www.kipo.go.kr and establishes a connection using the IP address for communication at step 380.

Figure 4:
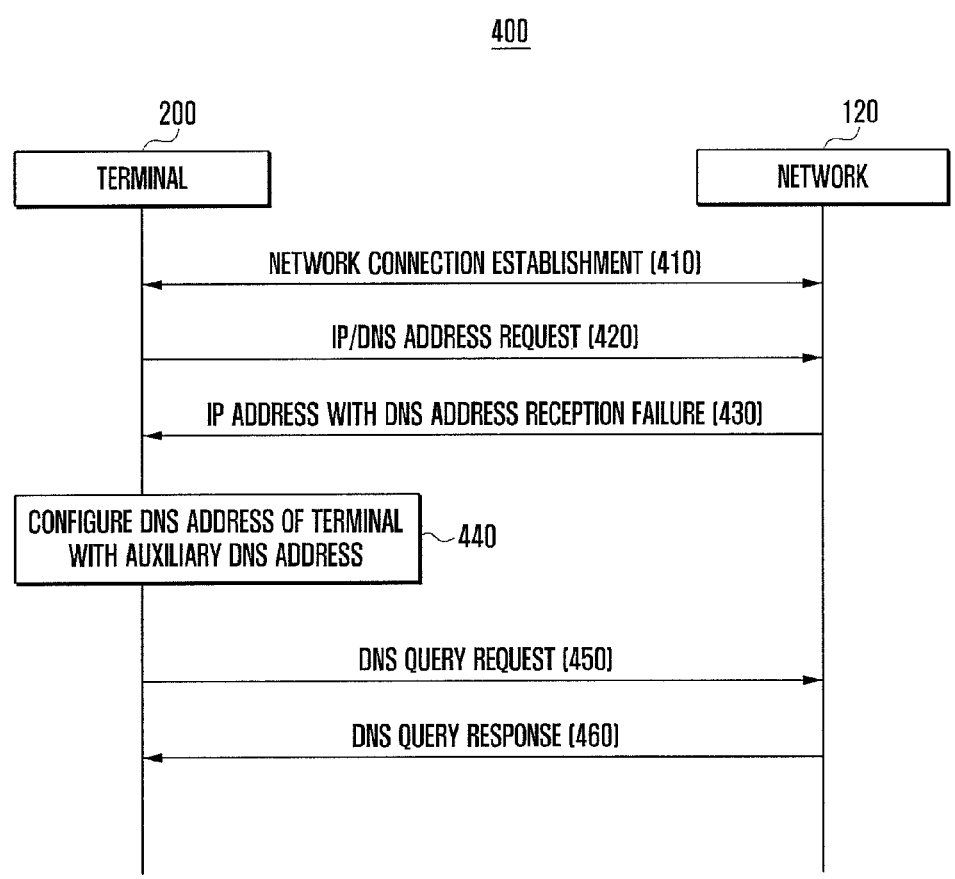
FIG. 4 is a signaling diagram illustrating a DNS address configuration method of a terminal according to an exemplary embodiment of the present invention.

FIG. 4 is a signaling diagram illustrating a DNS address configuration method of a terminal according to an exemplary embodiment of the present invention.

Referring to FIG. 4, a terminal 200 establishes a connection with the network 120 at step 410. The terminal 200 requests the network 120 for an IP address and a DNS address at step 420. The terminal 200 receives the IP address but fails to receive the DNS address at step 430. Because the terminal 200 has failed to receive the DNS address, the terminal 200 configures its DNS address with an auxiliary DNS address at step 440. For example, if multiple auxiliary DNS addresses are stored in the storage unit 250, then the terminal 200 configures its DNS address with the auxiliary DNS address having the highest priority.

Next, the terminal 200 transmits a DNS query request to the configured DNS address (i.e. the auxiliary DNS address) at step 450. The terminal 200 receives a DNS query response including the IP address from the network 120 in response to the DNS query request at step 460. Afterward, the terminal 200 performs communication using the received IP address.

Figure 5:
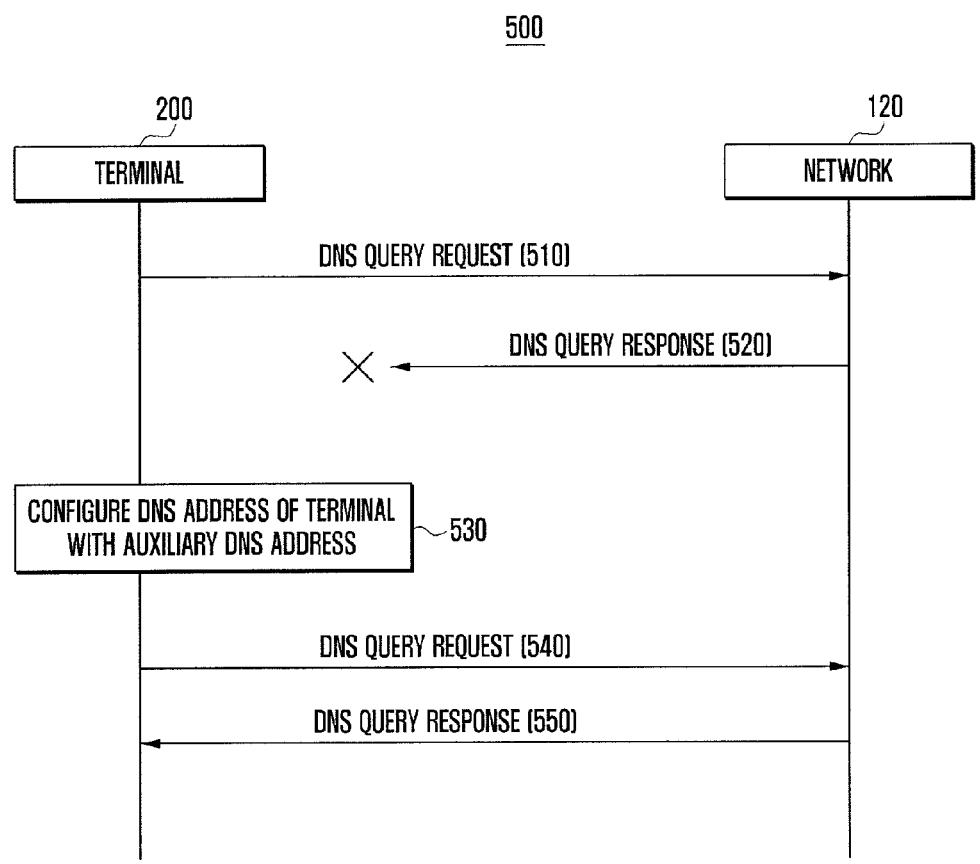
FIG. 5 is a signaling diagram illustrating a DNS address configuration method of a terminal according to an exemplary embodiment of the present invention.

FIG. 5 is a signaling diagram illustrating a DNS address configuration method of a terminal according to an exemplary embodiment of the present invention.

Referring to FIG. 5, a terminal 200 transmits a DNS query request to the currently configured DNS address at step 510. The network 120 transmits a DNS query response to the terminal 200 at step 520, but the terminal 200 fails to receive the DNS query response. For example, if a DNS query response is not received in a predetermined time after the transmission of the DNS query request, then the terminal 200 determines that it failed to receive the DNS query response. In this case, the terminal 200 configures its DNS address with an auxiliary DNS address at step 530. If multiple auxiliary DNS addresses are stored and if the currently configured DNS address is an auxiliary DNS address, then the terminal 200 can reconfigure its DNS address with another auxiliary DNS address having the next highest priority.

Next, the terminal 200 transmits the DNS query request to the configured DNS address (i.e., auxiliary DNS address) at step 540. Finally, the terminal receives a DNS query response (i.e. the DNS query response including the IP address) from the network 120 at step 550. The terminal 200 may perform communication using the received IP address.

As described above, the DNS address configuration method and apparatus according to exemplary embodiments of the present invention is advantageous to configure the DNS address of a terminal even if the terminal fails to receive the DNS address from the network or if the received DNS address is erroneous.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a non-transitory computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in reverse order according to their functions.

The term "module" according to exemplary the embodiments of the present invention, means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

The foregoing disclosure has been set forth merely to illustrate the present invention and is not intended to be limiting. Because modifications of the disclosed embodiments incorporating the spirit and substance of the present invention may occur to persons skilled in the art, the present invention should be construed to include everything within the scope of the appended claims and equivalents thereof.

The terminal according to an exemplary embodiment of the present invention can be any of portable electronic devices including cellular phone, Personal Digital Assistant (PDA), navigator, digital broadcast receiver, Portable Multimedia Player (PMP), and/or the like.

It should be understood that the present invention can be practiced in various forms without departing from the sprit and scope of the invention as defined by the appended claims. Thus, the above exemplary embodiments are merely illustrative and should not be considered restrictive in any way. The scope of the present invention is defined by the appended claims and not restricted by the descriptions of the specification and abstract. Further, all variations and modifications which come within the equivalent range of the claims are embraced in the scope of the present invention.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for configuring a Domain Name System (DNS) address in a terminal, the method comprising:
    establishing a connection with a network;
    requesting the DNS address from the network;
    determining that an acquisition of the DNS address from the network has failed;
    in response to the determination that the acquisition of the DNS address from the network has failed, automatically configuring the DNS address of the terminal to be one of a plurality of auxiliary DNS addresses based on a priority, the plurality of auxiliary DNS addresses being stored with the priority in the terminal; and
    transmitting a DNS query request including a domain name to the one of the plurality of auxiliary DNS addresses for requesting an IP address of the domain name.

2. The method of claim 1, further comprising:
    receiving the DNS address and configuring the terminal with the received DNS address;
    transmitting the DNS query request using the configured DNS address; and
    determining that the acquisition of the DNS address from the network has failed when no reply is received in response to the DNS query request.

3. The method of claim 2, wherein if the configured DNS address used to transmit the DNS query request corresponds to one of the plurality of auxiliary DNS addresses stored in the terminal, and if no reply is received in response to the DNS query request, then the DNS address is configured to be another one of the plurality of auxiliary DNS addresses having a next highest priority relative to the one of the plurality of auxiliary DNS addresses used in transmitting the DNS query request.

4. The method of claim 1, wherein the requesting of the DNS address from the network comprises transmitting a DNS address request to the network, and determining, by the terminal, if no DNS address is received in response to the DNS address request, that the acquisition of the DNS address from the network has failed.

5. The method of claim 4, wherein the terminal determines, if an erroneous DNS address is received in response to the DNS address request, that the acquisition of the DNS address from the network has failed.

6. The method of claim 4, wherein the terminal determines, if no DNS address response is received in a predetermined time after transmission of the DNS address request, that the acquisition of the DNS address from the network has failed.

7. The method of claim 1, further comprising configuring the one of the plurality of auxiliary DNS addresses according to a user input.

8. A terminal configured with a Domain Name System (DNS) address, the terminal comprising:
    a communication unit which establishes a connection with a network;
    a DNS address acquisition unit which requests the DNS address from the network;
    a storage unit which stores a plurality of auxiliary DNS addresses; and
    a DNS address configuration unit which:
        determines that an acquisition of the DNS address from the network has failed, and
        when the DNS address configuration unit determines that the acquisition of the DNS address from the network has failed, automatically configures the DNS address of the terminal to be one of a plurality of auxiliary DNS addresses based on a priority, the plurality of auxiliary DNS addresses being stored with the priority in the storage unit,
    wherein the communication unit transmits a DNS query request including a domain name to the one of the plurality of auxiliary DNS addresses for requesting an IP address of the domain name.

9. The terminal of claim 8,
    wherein the DNS address configuration unit:
        receives the DNS address, and
        configures the terminal with the received DNS address, wherein the communication unit transmits the DNS query request using the configured DNS address, and wherein the DNS address configuration unit determines that the acquisition of the DNS address from the network has failed when no reply is received in response to the DNS query request.

10. The terminal of claim 9, wherein if the configured DNS address used to transmit the DNS query request corresponds to one of the plurality of auxiliary DNS addresses stored in the storage unit, and if no reply is received in response to the DNS query request, then the DNS address is configured to be another one of the plurality of auxiliary DNS addresses having a next highest priority relative to the one of the plurality of auxiliary DNS addresses used in transmitting the DNS query request.

11. The terminal of claim 8, wherein the DNS address acquisition unit:

transmits a DNS address request to the network, and determines, if no DNS address is received in response to the DNS address request, that the acquisition of the DNS address from the network has failed.

12. The terminal of claim 8, wherein the DNS address configuration unit determines, if an erroneous DNS address is received in response to the DNS address request, that the acquisition of the DNS address from the network has failed.

13. The terminal of claim 8, wherein the DNS address configuration unit determines, if no DNS address response is received in a predetermined time after transmission of the DNS address request, that the acquisition of the DNS address from the network has failed.

14. The terminal of claim 8, wherein the terminal further comprises an input unit which receives a user input, and wherein the DNS address configuration unit configures the one of the plurality of auxiliary DNS addresses according to a user input made by means of the input unit.

15. A non-transitory computer readable storage medium of a terminal storing a program to configure a Domain Name System (DNS) address, the program comprising instructions to cause a computer to:

transmit to a network a DNS address request for the DNS address;

determine that an acquisition of the DNS address from the network has failed;

in response to the determination that the acquisition of the DNS address from the network has failed, automatically configure the DNS address of the terminal to be one of a plurality of auxiliary DNS addresses based on a priority, the plurality of auxiliary DNS addresses being stored with the priority in the terminal; and transmit a DNS query request including a domain name to the one of the plurality of auxiliary DNS addresses for requesting an IP address of the domain name.

* * * * *